Jan. 13, 1970 H. L. HEROLD ET AL 3,490,003

DATA TRANSFER PRIORITY APPARATUS

Filed July 29, 1960

INVENTOR.
DAVID W. MASTERS ET AL

BY

ATTORNEY.

United States Patent Office 3,490,003
Patented Jan. 13, 1970

3,490,003

DATA TRANSFER PRIORITY APPARATUS

Henry L. Herold, Tustin, Calif., David W. Masters, Phoenix, Ariz., and Robert B. Wright, Jr., Saratoga, Calif., assignors to General Electric Company, a corporation of New York Filed July 29, 1960, Ser. No. 53,023
Int. Cl. G11b *13/00;* G06f *1/00, 7/00*
U.S. Cl. 340—172.5 30 Claims

ABSTRACT OF THE DISCLOSURE

A data processing system for providing access between the memory thereof and peripheral components according to a predetermined schedule of priority, wherein at each occurrence of control signals issuing at regular intervals in the data processing unit, apparatus tests for the presence of communication request signals from any of the peripheral components denoting that the component is ready to receive from or transmit to the memory a data item, and wherein the peripheral component allocated highest priority among such components delivering request signals is then permitted communication with the memory for transferring a data item.

Figure 1:
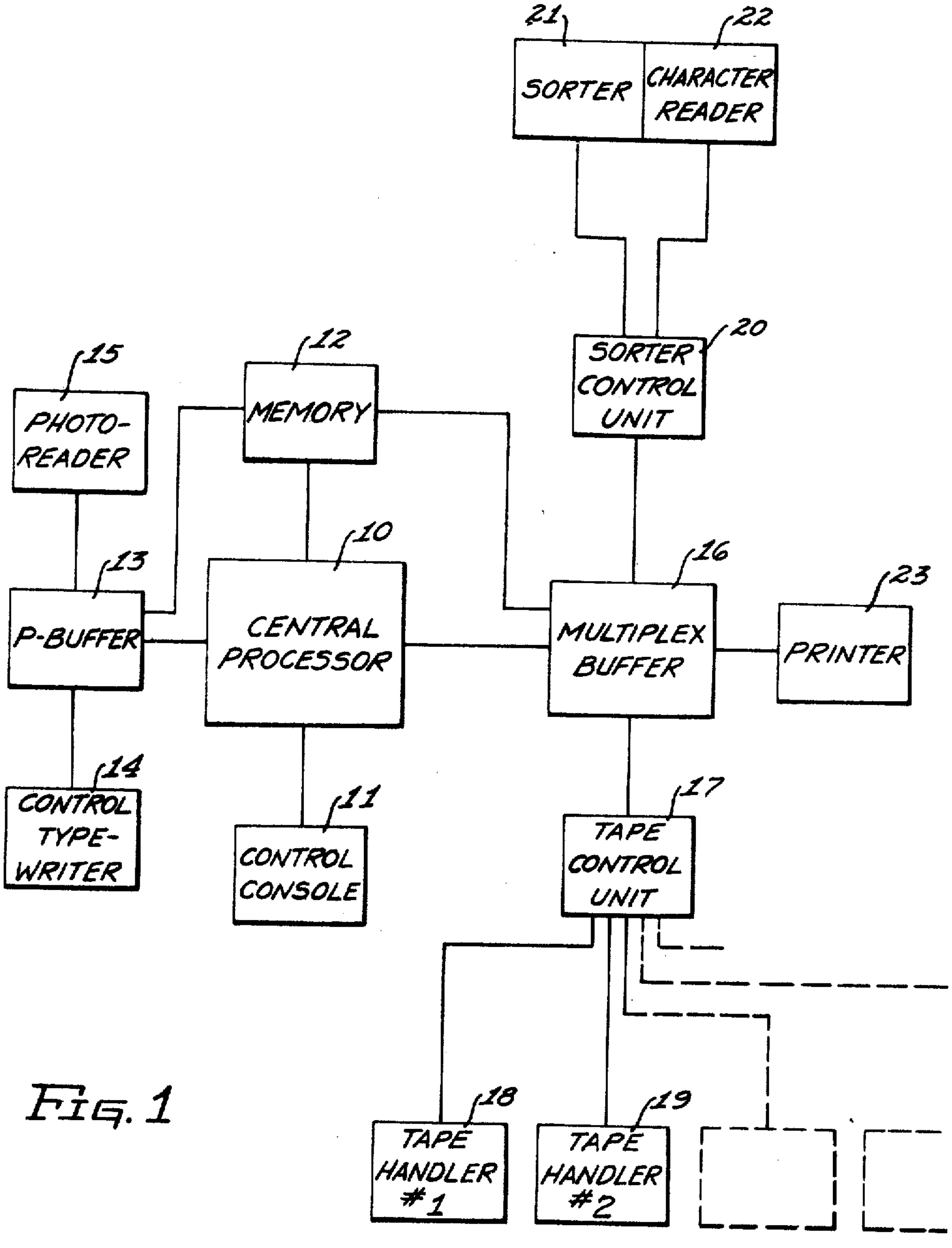

This invention relates to information processing apparatus and more particularly to apparatus for processing data at high speeds and adapted to communicate with peripheral components operating at different speeds.

In the processing of data, various arithmetic and logical operations are performed on data items by a data processing unit, which is adapted to execute a sequence of these operations in a very short period of time. To maintain a rapid rate of execution of these operations, the data processing unit must be able to immediately receive data items when needed and to immediately store data items after processing. Rapid receipt and storage of data items by the data processing unit is provided by a high-speed random access memory. The random access memory operates at a rate of speed compatible with that of the data processing unit and rapidly supplies a data item needed by the data processing unit or rapidly stores a data item provided by the data processing unit.

From time to time, the data processing unit will complete the processing of the data items in the memory or will fill the available memory storage space with processed data items, so that means must be provided to supply the memory with new data items for processing or to empty the memory contents. Consequently, peripheral components are provided, such as magnetic tape data storage units to supply data for processing and to receive processed data for storage, automatic document readers to supply data for processing and printers to receive processed data for recording. These peripheral components communicate with the memory, under control of the data processing unit, to transmit new data items to the memory or to receive processed data items therefrom. However, peripheral components transmit and receive data items at a much slower rate than the data processing unit processes data; for example, the time between transmittal or receipt of successive data items by a tape unit is comparable to the time required for the data processing unit to execute several operations. Therefore, it is desirable, in order to maintain a high average data processing speed, that the data processing unit does not remain idle during a period when one of the peripheral components is preparing a data item for transmission to the memory or is preparing to receive a data item from the memory. Instead, it is preferable that the data processing unit continue to execute the aforementioned sequence of operations, yielding priority for communication with the memory only when one of the peripheral components is ready to receive from or transmit to the memory a complete data item. Furthermore, means must be provided to allocate priorities to the peripheral components when more than one at a time requires communication with the memory, inasmuch as the memory is generally adapted at any one time to receive or transmit but one data item.

Therefore, it is an object of this invention to provide a high-speed data processing system adapted to communicate with slower operating components.

Another object of this invention is to provide a data processing system adapted to operate with minimum time of interruption for communication with components operating at different speeds.

Another object of this invention is to provide a data processing unit wherein the memory thereof is adapted to communicate with a plurality of data receiving and transmitting components.

Another object of this invention is to provide a data processing system wherein the memory thereof communicates with a plurality of components adapted for receiving and supplying data at different rates.

Another object of this invention is to provide apparatus for allocating priorities to a plurality of components adapted to communicate with a data storage unit.

The foregoing objects are achieved by providing a data processing system wherein appropriate signals are delivered when peripheral components are ready to communicate with the memory thereof and wherein the data processing unit of the system continues to execute its normal sequence of operations, responding only to these signals to allow the necessary data item transfer. Each of the peripheral components is allocated a different priority, according to a predetermined scale, for communicating with the memory. A first signal for each of the peripheral components is provided when the component is ready to receive from or transmit to the memory a complete data item. The data processing unit provides a succession of control signals at regular intervals. A control means responds to each of the control signals to test for the presence of any of the first signals and delivers an output signal when a first signal is detected, the output signal representing the peripheral component having the highest priority of those components whose corresponding first signals are detected. In response to the output signal delivered by the control means communication between the memory and such highest priority peripheral component is provided. If the data processing unit during its sequence of operations requires communication with the memory at this time the sequence is discontinued until all peripheral components having a corresponding first signal issuing are provided with their required communication with the memory.

The invention will be described with reference to the accompanying drawings, wherein:

FIGURE 1 is a block diagram of a data processing system to which the instant invention is applicable.

DATA PROCESSING SYSTEM—GENERAL

The Data Processing System of FIG. 1 is adapted to process data under operational control of a Central Processor 10. The lines interconnecting the various components illustrated in FIG. 1 represent symbolically paths of data and control communication.

The Central Processor responds to a plurality of distinct instructions, which are supplied thereto in the sequential order necessary to perform a particular data processing operation. A Control Console 11 provides an indicating and control station for the operator, whereby he has access to the system for modification of the order of execution of the instructions or for data revision. A Memory 12 stores data words which are to be processed, data words which are the results of processing, and instruction words. The Central Processor communicates with the Memory to receive therefrom data words on which operations are to be performed and instruction words. Following certain data processing operations, the Central Processor transmits the resulting data words to the Memory for storage.

A P-Buffer 13, controlled by the Central Processor, temporarily stores data words being transferred from a Control Typewriter 14 or a Photoreader 15 to Memory and data words being transferred from Memory to the Control Typewriter. The Control Typewriter receives data words from the P-Buffer and types a visible representation of these words or punches on paper tape an encoded representation of these words. The Control Typewriter also transfers data words to the P-Buffer by reading encoded punched paper tape or upon depression of Control Typewriter keys in proper sequence. The Photoreader photoelectrically reads punched encoded paper tapes and transfers the electrical representations of the data thereon to the P-Buffer.

A Multiplex Buffer 16, indirectly controlled by the Central Processor, temporarily stores data being transferred from magnetic tape or from magnetically imprinted documents to Memory and data being transferred from Memory for recording on magnetic tape or for imprinting in visible representation. A Tape Control Unit 17 directs one of a plurality of Tape Handlers 18, 19, etc., to read data from the respective magnetic tape thereof and to deliver this data to the Multiplex Buffer. The Tape Control Unit also directs one of the Tape Handlers to write data provided by the Multiplex Buffer on the respective magnetic tape thereof.

A Sorter Control Unit 20 controls the reading of data borne by documents, such as bank checks, and directs the sorting of these documents into pockets of a Sorter 21. A Character Reader 22 senses magnetically imprinted information on these documents and delivers an encoded representation of this data to the Multiplex Buffer. The Central Processor delivers to the Sorter Control Unit data representing the pockets of Sorter 21 in order that the documents handled thereby may be appropriately sorted in accordance with the information thereon.

A Printer 23 receives data words from the Multiplex Buffer and prints a visible representation of these words.

Thus, the system of FIG. 1 processes data received from magnetic tape, documents, the Control Typewriter, or the Photoreader and communicates the results of the data processing by providing a visible record, by permanently storing the results on magnetic tape, by punching paper tape, or by sorting documents.

For a complete description of the system of FIG. 1 and of the instant invention which is embodied in such system, reference is made to U.S. Patent 3,077,984 issued to R. R. Johnson and assigned to the assignee of the instant invention. More particularly, FIGURES 2 through 245 of the drawings; column 1, lines 8–73; column 2; column 3, lines 1–27; column 4, lines 55–75; columns 5 and 6; column 7, lines 1–16; column 8, lines 8–75; columns 9–258; and column 259, lines 1–35 of U.S. Patent 3,077,984 are incorporated herein by reference and made a part of the instant patent application.

What is claimed is:

1. A data processing system comprising a data storage unit for storing data, a plurality of data utilization media adapted to communicate with said data storage unit, each of said media being assigned a different priority according to a predetermined scale allocating priorities to said media for communicating with said data storage unit, means for providing a first signal for each of a corresponding one of said media when said corresponding medium is ready to communicate with said data storage unit, control means for testing for the presence of said first signals, said control means being adapted to deliver one of a plurality of different output signals when at least one of said first signals is detected thereby, said one output signal representing the medium having the highest priority of those media whose corresponding first signals are so detected, and means responsive to said one output signal for providing communication between said highest priority medium and said data storage unit.

2. Apparatus as in claim 1, wherein said control means is further adapted to deliver additional signals for inhibiting communication between said data storage unit and the others of said media having allocated thereto priorities lower than said highest priority.

3. A data processing system as in claim 1 further including means responsive to the completion of said communication between said highest priority medium and said data storage unit for enabling said control means to initiate communication between said data storage unit and others of said data utilization media.

4. A data processing system comprising a data storage unit for storing data, a plurality of data utilization media adapted to communicate with said data storage unit, each of said media being assigned a different priority according to a predetermined scale allocating priorities to said media for communicating with said data storage unit, means for providing a first signal for each of a corresponding one of said media when said corresponding medium is ready to communicate with said data storage unit, means for providing a succession of control signals, and control means responsive to the conjoint occurrence of one of said control signals and the one of said first signals representing the medium having the highest priority of those media whose corresponding first signals are occurring for providing communication between said highest priority medium and said data storage unit.

5. A data processing system as in claim 4, further including means responsive to the conjoint occurrence of one of said control signals and the one of said first signals representing the medium having the highest priority of those media whose corresponding first signals are occurring for inhibiting communication between said data storage unit and the others of said media having allocated priorities lower than said highest priority medium.

6. A data processing system comprising a data storage unit for storing data, a plurality of data utilization media adapted to communicate with said data storage unit, each of said media being assigned a different priority according to a predetermined scale allocating priorities to said media for communicating with said data storage unit, means for providing a first signal for each of a corresponding one of said media when said corresponding medium is ready to communicate with said data storage unit, means for providing a succession of control signals, control means responsive to each one of said control signals for testing for the presence of said first signals, said control means adapted to deliver one of a plurality of different output signals when at least one of said first signals is detected thereby, said one output signal representing the medium having the highest priority of those media whose corresponding first signals are so detected, means responsive to said one output signal for enabling communication between said highest priority medium and said data storage unit, and wherein said control means is further adapted to deliver additional signals for inhibiting communication between said data storage unit and all of said media having allocated thereto priorities lower than said highest priority.

7. A data processing system comprising a data storage unit for storing data, a plurality of data utilization media adapted to communicate with said data storage unit, each of said media being assigned a different priority according to a predetermined scale allocating priorities to said media for communicating with said data storage unit, means for providing a first signal for each of a corresponding one of said media when said corresponding medium is ready to communicate with said data storage unit, a data channel for each of said media, said data channel being responsive to a respective second signal for providing communication between the corresponding medium and said data storage unit, means for providing a sucession of control signals, and control means responsive to each one of said control signals for testing for the presence of said first signals, said control means being adapted to delived one of a plurality of said second signals when at least one of said first signals is detected thereby, said one second signal corresponding to the medium having the highest allocated priority of those media whose first signals are so detected.

8. A data processing system comprising a data storage unit for storing data, a plurality of data utilization media adapted to communicate with said data storage unit, each of said media being assigned a different priority according to a predetermined scale allocating priorities to said media for communicating with said data storage unit, means for providing a first signal for each of a corresponding one of said media when said corresponding medium is ready to communicate with said data storage unit, a data channel for each of said media, said data channel being adapted to provide communication between the corresponding medium and said data storage unit, means for providing a succession of control signals, control means responsive to each one of said control signals for testing for the presence of said first signals, said control means being adapted to deliver one of a plurality of different output signals when at least one of said first signals is detected thereby, said one output signal representing the medium having the highest priority of those media whose corresponding first signals are so detected, and means responsive to said one output signal for enabling communication through the one of said data channels corresponding to said highest priority medium.

9. A data processing system as in claim 8, wherein said control means is further adapted to deliver additional signals for disabling communication through the data channels corresponding to the media having priorities allocated thereto lower than said highest priority.

10. In a data processing system, a data storage unit for storing data, a data processing unit for performing a sequence of operations requiring said data processing unit to communicate with said data storage unit, a plurality of data utilization media adapted to communicate with said data storage unit, each of said media being assigned a different priority according to a predetermined scale allocating priorities to said media for communicating with said data storage unit, means for providing a first signal for each of a corresponding one of said media when said corresponding medium is ready to communicate with said data storage unit, means for providing a succession of control signals, control means responsive to each one of said control signals for testing for the presence of said first signals, said control means being adapted to deliver one of a plurality of different output signals when at least one of said first signals is detected thereby, said one output signal representing the medium having the highest priority of those media whose corresponding first signals are detected thereby, and means responsive to said one output signal for terminating communication of said data processing unit with said data storage unit and for providing communication between said highest priority medium and said data storage unit.

11. A data processing system as in claim 10, further including means for disabling operation of said control means following delivery of an output signal thereby during the interval when the corresponding medium is communicating with said data storage unit.

12. In a data processing system, a data storage unit for storing data, a register, means for entering a sequence of command codes into said register, a data processing unit for performing a sequence of operations requiring said data processing unit to communicate with said data storage unit in response to said sequence of command codes in said register, a plurality of data utilization media adapted to communicate with said data storage unit, each of said media being assigned a different priority according to a predetermined scale allocating priorities to said media for communicating with said data storage unit, means for providing a first signal for each of a corresponding one of said media when said corresponding medium is ready to communicate with said data storage unit, means for providing a succession of control signals, control means responsive to each one of said control signals for testing for the presence of said first signals, said control means being adapted to deliver one of a plurality of different output signals when at least one of said first signals is detected thereby, said one output signal representing the medium having the highest priority of those media whose corresponding first signals are detected thereby, means responsive to said one output signal for terminating entry of said sequence of command codes into said register and for inserting into said register a predetermined command code, and means responsive to said predetermined command code in said register for providing communication between said highest priority medium and said data storage unit.

13. A data processing system as in claim 12, further including means responsive to the completion of said communication between said medium and said data storage unit for restoring the entry of said sequence of command codes into said register.

14. A data processing system comprising a data storage unit for storing data, a plurality of data utilization media adapted to communicate with said data storage unit, each of said media being assigned a different priority according to a predetermined scale allocating priorities to said media for communicating with said data storage unit, means for providing a first signal for each of a corresponding one of said media when said corresponding medium is ready to communicate with said data storage unit, means for providing a succession of control signals, control means responsive to each one of said control signals for testing for the presence of said first signals, said control means being adapted to deliver one of a plurality of different output signals when at least one of said first signals is detected thereby, said one output signal representing the medium having the highest priority of those media whose corresponding first signals are so detected, and means responsive to said one output signal for providing communication between said highest priority medium and said data storage unit.

15. In a data processing system, a data storage unit for storing data, a data processing unit for performing a sequence of operations requiring said data processing unit to communicate with said data storage unit, a plurality of data utilization media adapted to communicate with said data storage unit, each of said media and said data processing unit being assigned a different priority according to a predetermined scale allocating priorities to said media and said data processing unit for communicating with said data storage unit, wherein said data processing unit is allocated lowest priority, means for providing a first signal for each of a corresponding one of said media when said corresponding medium is ready to communicate with said data storage unit, means for providing a succession of control signals, control means responsive to each one of said control signals for testing for the presence of said first signals, said control means being adapted to deliver one of a plurality of different output signals when at least one of said first signals is detected thereby, said one output signal representing the medium having the highet priority of those media whose corresponding first signals are detected thereby, means responsive to said one output signal for providing communication between said highest priority medium and said data storage unit, and means for providing communication between said data processing unit and said data storage unit when no one of said media is ready to communicate with said data storage unit.

16. A data processing system comprising: a data storage unit for storing data; a plurality of devices for communicating with said data storage unit; demand signalling means for providing a first signal for each of a corresponding one of said devices when said corresponding device is ready to communicate with said data storage unit; a priority access controlling means comprising a plurality of input terminals coupled to said demand signalling means for receiving respective ones of said first signals, each input terminal being allocated a different priority designation, and an output terminal for each of said input terminals, said controlling means at a predetermined time responding to all current first signals being received at said time for delivering a second signal at the one of said output terminals corresponding to the input terminal having the highest priority designation of the ones of said input terminals receiving said current first signals; a data channel, normally disabled, fo reach of said devices, each of said channels, when enabled, providing communication between the corresponding one of said devices and said data storage unit; and an enabling means for each of said channels, each of said enabling means being coupled to one of said output terminals and to the corresponding one of said channels, each of said enabling means being responsive to a second signal delivered at the respective output terminal for enabling the corresponding channel.

17. A data processing system comprising: a data storage unit for storing data; a plurality of devices for communicating with said data storage unit; demand signalling means for providing a first signal for each of a corresponding one of said devices when said corresponding device is ready to communicate with said data storage unit; means for providing a succession of control signals; a priority access controlling means comprising a plurality of input terminals coupled to said demand signalling means for receiving respective ones of said first signals, each input terminal being allocated a different priority designation, and an output terminal for each of said input terminals, said controlling means being further coupled to receive said control signals, said controlling means being actuated at the time of receipt of each of said control signals for responding to all current first signals being received at said time for delivering a second signal at the ones of said output terminals corresponding to the input terminal having the highest priority designation of the ones of said input terminals receiving said current first signals; a data channel, normally disabled, for each of said devices, each of said channels, when enabled, providing communication between the corresponding one of said devices and said data storage unit; and an enabling means for each of said channels, each of said enabling means being coupled to one of said output terminals and to the corresponding one of said channels, each of said enabling means being responsive to a second signal delivered at the respective output terminal for enabling the corresponding channel.

18. A data processing system comprising: a data storage unit for storing data; a plurality of devices for communicating with said data storage unit; demand signalling means responsive to the status of each of said devices for providing a first signal for each of said devices when the corresponding device is ready to communicate with said data storage unit; means for providing a succession of control signals; a priority access controlling means comprising a plurality of input terminals coupled to said demand signalling means for receiving respective ones of said first signals, each input terminal being allocated a different priority designation, and an output terminal for each of said input terminals, said controlling means being further coupled to receive said control signals, said controlling means being actuated at the time of receipt of each of said control signals for responding to all current first signals being received at said time for delivering a second signal at the ones of said output terminals corresponding to the input terminal having the highest priority designation of the ones of said input terminals receiving said current first signals; a data channel, normally disabled, for each of said devices, each of said channels, when enabled, providing communicataion between the corresponding one of said devices and said data storage unit; and an enabling means for each of said channels, each of said enabling means being coupled to one of said output terminals and to the corresponding one of said channels, each of said enabling means being responsive to a second signal delivered at the respective output terminal for enabling the corresponding channel.

19. A data processing system comprising: a data storage unit for storing data; a data processing device for performing a sequence of operations requiring said data processing device to communicate with said data storage unit; a plurality of additional devices for communicating with said data storage unit; demand signalling means for providing a first signal for each of a corresponding one of said devices when said correseponding device is ready to communicate with said data storage unit; a priority access controlling means comprising a plurality of input terminals coupled to said demand signalling means for receiving respective ones of said first signals, each input terminal being allocated a different priority designation, and an output terminal for each of said input terminals, said controlling means at a predetermined time responding to all current first signals being received at said time for delivering a second signal at the one of said output terminals corresponding to the input terminal having the highest priority designation of the ones of said input terminals receiving said current first signals, wherein said controlling means is coupled to receive said first signal for said data processing device at the one of said input terminals allocated the lowest priority designation; a data channel, normally disabled, for each of said devices, each of said channels, when enabled, providing communication between the corresponding one of said devices and said data storage unit; and an enabling means for each of said channels, each of said enabling means being coupled to one of said output terminals and to the corresponding one of said channels, each of said enabling means being responsive to a second signal delivered at the respective output terminal for enabling the corresponding channel.

20. The system of claim 19, further including means operative during the delivery of one of said second signals for preventing the delivery of a further one of said second signals.

21. A data processing system comprising: a data storage unit for storing data; a plurality of devices for communicating with said data storage unit; demand signalling means for providing a first signal for each of a corresponding one of said devices when said corresponding device is ready to communicate with said data storage unit; means for providing a succession of control signals; a plurality of signal transmission gates coupled to said demand signalling means for receiving respective ones of said first signals and all of said gates coupled to receive and being normally enabled by said control signals, each of said gates being allocated a different priority designation, each of said gates, when enabled, responding to a first signal received thereby for delivering a second signal at a respective output terminal thereof; means responsive to the first signal received by the gate having the highest priority designation of all of said gates receiving first signals at the time of receipt of said control signals for disabling all gates designated of lower priority; a data channel, normally disabled, for each of said devices, each of said channels, when enabled, providing communication between the corresponding one of said devices and said data storage unit; and an enabling means for each of said channels, each of said enabling means being coupled to one of said output terminals and to the corresponding one of said channels, each of said enabling means being responsive to a second signal delivered at the respective output terminal for enabling the corresponding channel.

22. In combination, a plurality of first data handling means, second data handling means, data storage means for temporarily storing data, first transmission means for transferring data between said data storage means and said second data handling means, second transmission means for transferring data between said plurality of first data handling means and said data storage means, control means for providing a signal for each of said first data handling means when the corresponding first data handling means is ready to communicate with said second data handling means, and selection means responsive to the signals provided by said control means for controlling which one of said plurality of first data handling means is to communicate with said second data handling means through said data storage means.

23. The combination of claim 22 including timing means connected to said data storage means for controlling the rate of transfer of data between the selected one of said plurality of first data handling means and said data storage means.

24. In combination, a plurality of first data handling means, second data handling means, data storage means for temporarily storing data, first transmission means for transferring data between said data storage means and said second data handling means, second transmission means for transferring data between said plurality of first data handling means and said data storage means, control means for providing a signal for each of said first data handling means when the corresponding first data handling means is ready to communicate with said second data handling means, and selection means and responsive to the signals provided by said control means serially connected with said data storage means and said first and second transmission means between said plurality of first data handling means and said second data handling means for controlling which one of said plurality of first data handling means is to communicate with said second data handling means through said data storage means.

25. In combination, a plurality of first data handling means, second data handling means, data storage means for temporarily storing a group of data entities, first transmission means for transferring groups of data entities between said data storage means and said second data handling means, the data entities of each group being transferred substantially simultaneously, second transmission means for transferring data entities in sequence between said plurality of first data handling means and said data storage means, control means for providing a signal for each of said first data handling means when the corresponding first data handling means is ready to communicate with said second data handling means, and selection means responsive to the signals provided by said control means for controlling which one of said plurality of first data handling means is to communicate with said second data handling means through said data storage means.

26. The combination of claim 25 including timing means connected to said data storage means for controlling the rate of transfer of data entities between the selected one of said plurality of first data handling means and said data storage means.

27. In combination, a plurality of first data handling means, second data handling means, data storage means for temporarily storing data, first transmission means for transferring data between said data storage means and said second data handling means, second transmission means for transferring data between said plurality of first data handling means and said data storage means, control means for providing a signal for each of said first data handling means when the corresponding first data handling means is ready to communicate with said second data handling means, selection means responsive to the signals provided by said control means for controlling which one of said plurality of first data handling means is to communicate with said second data handling means through said data storage means, and timing means for applying gating pulses to said data storage means for controlling the rate of transfer of data between the selected one of said plurality of first data handling means and said data storage means, said timing means including a timing counter for counting at a predetermined rate and a decoding means connected to said timing counter for generating the gating pulses in response to a predetermined count of said timing counter.

28. In combination, a plurality of first data handling means, second data handling means, data storage means including a shift register for temporarily storing a group of data entities, first transmission means for transferring groups of data entities between said data storage means and said second data handling means, the data entities of each group being transferred substantially simultaneously, second transmission means for transferring data entities in sequence between said plurality of first data handling means and said data storage means, responsive to the signals provided by said control means selection means control means for providing a signal for each of said first data handling means when the corresponding first data handling means is ready to communicate with said second data handling means, for controlling which one of said plurality of first data handling means is to communicate with said second data handling means through said data storage means, and timing means for applying gating pulses to said shift register for controlling the rate of transfer of data entities between the selected one of said plurality of first data handling means and said data storage means, said timing means including a timing counter for counting at a predetermined rate and a decoding means connected to said timing counter for generating the gating pulses.

29. In combination, a plurality of first data handling means, second data handling means, data storage means connected to said plurality of first data handling means and to said second data handling means for temporarily storing a group of data entities, responsive to the signals provided by said control means selection means control means for providing a signal for each of said first data handling means when the corresponding first data handling means is ready to communicate with said second data handling means, for controlling which one of said plurality of first data handling means is to communicate with said second data handling means through said data storage means, timing means for generating gating pulses, means for applying said gating pulses to said data storage means for causing sequential transfer of data entities between said data storage means and the selected one of said plurality of first data handling means, and means responsive to a predetermined number of gating pulses for causing a group of data entities to be transferred between said data storage means and said second data handling means, the data entities of said group being transferred substantially simultaneously.

30. In combination, a plurality of first data handling means, second data handling means, data storage means including a shift register connected to said plurality of first data handling means and to said second data handling means for temporarily storing a group of data entities, control means for providing a signal for each of said first data handling means when the corresponding first data handling means is ready to communicate with said second data handling means, selection means responsive to the signals provided by said control means for controlling which one of said plurality of first data handling means is to communicate with said second data handling means through said data storage means, timing means for generating gating pulses, means for applying said gating pulses to said shift register for causing a data entity to be transferred between the selected one of said plurality of first data handling means and said data storage means for each gating pulse, means responsive to a predetermined number of gating pulses for causing a group of data entities to be transferred between said data storage means and said second data handling means, the data entities of said group being transferred substantially simultaneously.

References Cited

UNITED STATES PATENTS

| | | | |
|---|---|---|---|
| 2,946,986 | 7/1960 | Harrison | 340—172.5 |
| 3,061,192 | 10/1962 | Terzian | 340—172.5 X |

ROBERT C. BAILEY, Primary Examiner

G. D. SHAW, Assistant Examiner